United States Patent
Becker

(10) Patent No.: US 7,299,637 B2
(45) Date of Patent: Nov. 27, 2007

(54) METHOD AND DEVICE FOR OPERATING A GAS TURBINE WITH A FOSSIL-FUEL FIRED COMBUSTION CHAMBER

(75) Inventor: Bernard Becker, Muelheim a.d. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 781 days.

(21) Appl. No.: 10/724,809

(22) Filed: Dec. 1, 2003

(65) Prior Publication Data

US 2004/0244381 A1 Dec. 9, 2004

(51) Int. Cl.
*F02C 6/18* (2006.01)

(52) U.S. Cl. ............ 60/772; 60/39.182; 60/39.52

(58) Field of Classification Search ............ 60/39.182, 60/39.52, 772, 783, 784
See application file for complete search history.

(56) References Cited

U.S. PATENT DOCUMENTS

| 4,434,613 | A | * | 3/1984 | Stahl ................... 60/39.52 |
| 4,498,289 | A |   | 2/1985 | Osgerby |
| 5,435,123 | A | * | 7/1995 | Scholl et al. ............ 60/39.52 |
| 5,724,805 | A | * | 3/1998 | Golomb et al. .......... 60/39.52 |
| 6,269,624 | B1 | * | 8/2001 | Frutschi et al. .......... 60/39.52 |
| 2002/0100271 | A1 | | 8/2002 | Viteri et al. |

FOREIGN PATENT DOCUMENTS

| DE | 43 35 136 A1 | 4/1994 |
| DE | 199 52 884 A1 | 5/2001 |
| EP | 0 453 059 A1 | 10/1991 |
| WO | WO 02/38927 | 5/2002 |

* cited by examiner

*Primary Examiner*—L. J. Casaregola

(57) ABSTRACT

A method according to the invention or a corresponding device (1) provides for dividing exhaust gas (9) exiting the gas turbine into a first (11) and a second partial stream (13), for mixing the first partial stream (11) with combustion air (15), and for channeling the resulting mixture (17) to the combustion chamber (5) and the second partial stream (13) to a carbon dioxide precipitation plant (21).

In an advantageous embodiment the exhaust gas (9) exiting the gas turbine (3) is previously used to generate process steam (31) for a steam turbine (33) (gas and steam power station) then cooled before the exhaust gas (9) is divided into said partial streams (11,13). Water (29) precipitating during cooling is removed.

14 Claims, 1 Drawing Sheet

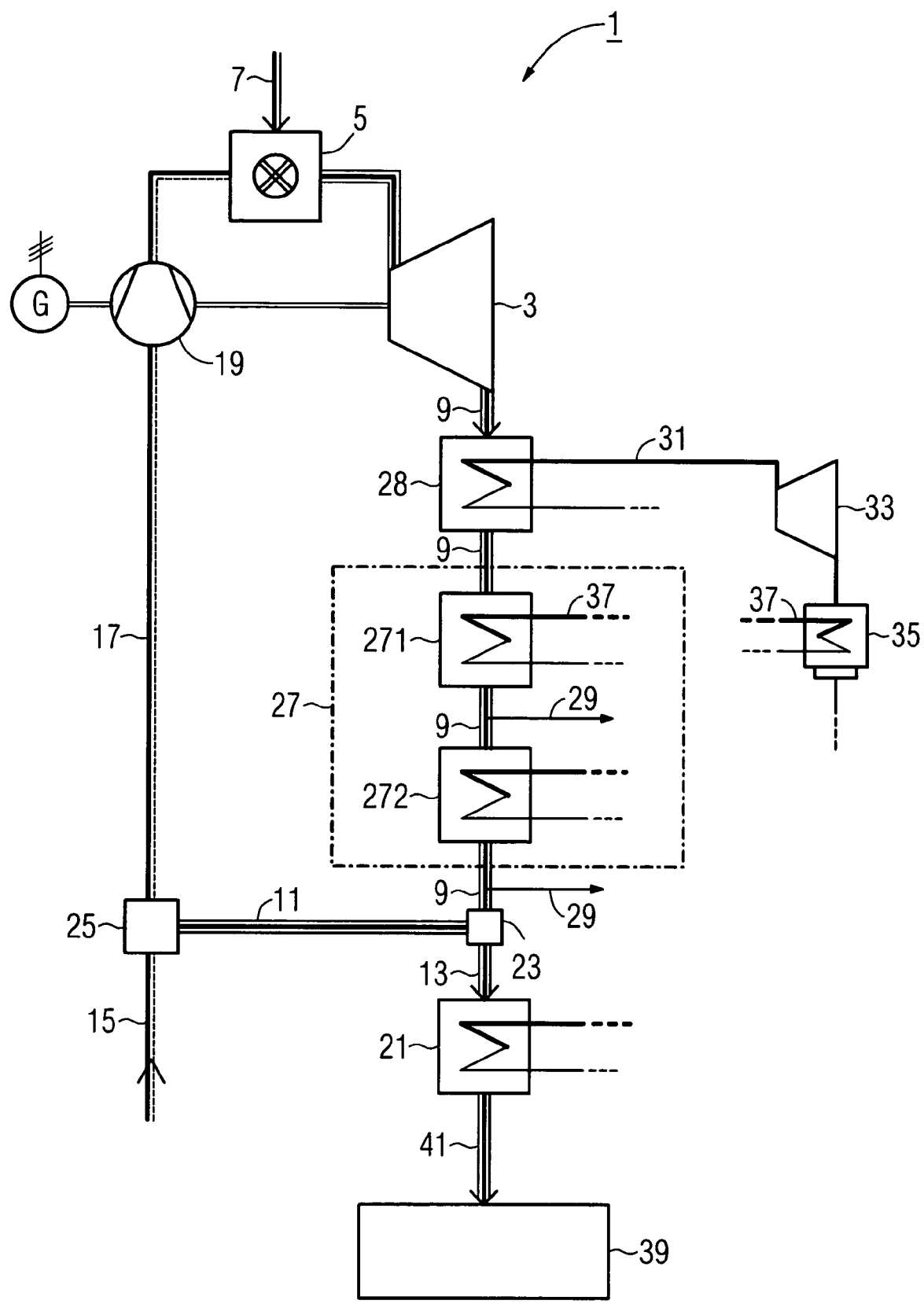

METHOD AND DEVICE FOR OPERATING A GAS TURBINE WITH A FOSSIL-FUEL FIRED COMBUSTION CHAMBER

CROSS REFERENCE TO RELATED APPLICATIONS

This application claims priority to the European application No. 02027430.4 EP, filed Dec. 9, 2002 under the European Patent Convention and which is incorporated by reference herein in its entirety.

FIELD OF INVENTION

The invention relates to a method and a device for operating a gas turbine with a fossil-fuel fired combustion chamber.

BACKGROUND OF INVENTION

One of the progressively more urgent environmental problems of modern times is posed by increasing air pollution, to which noxious substances produced by a wide variety of combustion processes are making a not insubstantial contribution.

The list of such products of combustion is headed in particular by gasses having a harmful impact on the climate such as nitrogen oxides and carbon dioxide.

The environment is also polluted with the above-mentioned climatically harmful gasses produced from generating electrical energy by the burning of fossil fuel.

In the case of a gas-fired power station, for instance, these gasses are contained in the exhaust gas of a gas turbine and have to be suitably handled in particular for the purpose of complying with the prescribed emission standards.

This problem is somewhat less pronounced in the case of power stations employing a combined gas/steam process because, owing to their high degree of efficiency compared to pure gas-fired or pure steam-powered power stations, power stations of this type operated by means of both gas and steam produce fewer gasses that are harmful to the climate.

However, even these power stations require substantial effort to handle the climatically harmful gases they produce in an environmentally friendly manner.

Precipitation of the carbon dioxide produced during the combustion of hydrocarbons, such as natural gas or heating oil, or of synthetic gasses, such as gasses resulting from a gasification of coal, heavy oil or biomass, can occur as a result, for example, of intense cooling of the combustion gasses to substantially below 0° C., during which initially water forms followed by carbon dioxide in liquid form, with the possibility that the latter may freeze if cooling is very intense and thus appear in solid form.

This liquid or solid carbon dioxide can then be stored so that it can no longer escape into the atmosphere and mix with air.

However, typical exhaust gas of a gas turbine contains approximately only 5-10% carbon dioxide and more than 70% nitrogen and/or nitrogen compounds, so that a very substantial amount of exhaust gas has to be cooled in order to precipitate the relatively small amount of carbon dioxide. This necessities correspondingly large dimensioning of a carbon dioxide precipitation plant provided for this purpose and is associated with high energy requirements.

SUMMARY OF INVENTION

The object of the invention is therefore to disclose an improved method and a device for operating a gas turbine with a fossil-fuel fired combustion chamber.

The aim is, in particular, to achieve a maximum reduction, tending toward zero emission, in the amount of climatically harmful gasses released into the environment, in particular nitrogen oxides and/or carbon dioxide.

The object is achieved according to the invention by means of methods for operating a gas turbine with a fossil-fuel fired combustion chamber through the following steps:
  the exhaust gas exiting the gas turbine is divided into a first and a second partial stream,
  the first partial stream is mixed with combustion air and the resulting mixture is channeled back to the combustion chamber, and
  the second partial stream is channeled to a carbon dioxide precipitation plant.

The invention proceeds from the observation that a reduction in exhaust gas with a nitrogen oxide content can in particular be achieved by reducing the oxygen content of the air mixture which is used for combustion and which is channeled to the combustion chamber. There is a consequent drop in the partial oxygen pressure in the combustion flame which results in a required reduction in the rate at which nitrogen oxides form, and, owing to the high inert gas component in an air mixture of this type, the combustion flame has a lower temperature than when combustion takes place with normal combustion air, having an approximately 21% oxygen content, being supplied.

The carbon dioxide precipitation plant employed in conjunction with a method according to the invention can furthermore be dimensioned smaller than provided by the prior art as only a partial stream, namely the second partial stream, of the exhaust gas, accounting for in particular 20-70%, preferably around 50%, of the exhaust gas stream, is channeled to the carbon dioxide precipitation plant. The latter can consequently be designed for a smaller amount of exhaust gas compared to the prior art, which also means correspondingly reduced energy requirements. This, in particular, also means consistent current generation with a simultaneous reduction in the occurrence of carbon dioxide.

The first partial stream is recirculated to the combustion chamber mixed with normal combustion air.

Mixing of the first partial stream with the combustion air is preferably carried out such that the ensuing mixture has approximately half the oxygen content compared to normal combustion air, in particular around 12%.

This ensures that, except for a small residue, in particular between 0 and 5% and typically 3%, the oxygen component of the mixture is used in the combustion chamber in the ensuing combustion process.

The residual oxygen in the exhaust gas after the combustion process can accordingly be set by setting the quantitative relationship between the combustion air and the first partial stream as required.

Combustion thus takes place substantially completely and the production of carbon monoxide is also reduced.

The exhaust gas is advantageously cooled before being divided into the first and second partial stream and water forming during this process is removed.

This will reduce the remaining amount of exhaust gas requiring handling, in particular its oxygen component, because oxygen bound in the water can be removed in an environmentally friendly manner.

Cooling of the exhaust gas preferably takes place in at least a first and a second cooling stage.

A multi-stage cooling method of this type allows a required temperature gradient to which the exhaust gas is subjected to be favorably set so that precipitation of the water can be optimized in terms of quantity and/or time. Efficient use of the energy that has to be invested for cooling is also made possible by this.

In a particularly preferred embodiment, after exiting the gas turbine the exhaust gas is channeled to a waste-heat steam generator for generating process steam for a steam turbine then channeled to the first cooling stage.

The efficiency of a gas and steam power station of this type is especially high owing to the use of the heat contained in the exhaust gas of the gas turbine in a combined gas and steam process. The first cooling stage is preferably operated by means of a coolant which is also used for operating a condenser into which expanded steam exiting the turbine is introduced.

The condenser is in any event present in a gas and steam power station and is operated by means of a coolant for condensing the expanded steam from the steam turbine. The condensed steam is then channeled back into the feed-water cycle.

In the present embodiment the coolant employed in any event in the condenser's cooling cycle is now also used for operating the first cooling stage.

The effort for embodying the first cooling stage is hence reduced through double usage of the coolant embodied, for example, by connecting the cooling cycles of the condenser and first cooling stage in series or in parallel.

The coolant can be air and/or water.

The carbon dioxide precipitation plant preferably encompasses a cooling process for cooling the second partial stream.

Carbon dioxide precipitation plant of this type with refrigerating action is known, has been tried and tested, and can easily be used in conjunction with a method according to the invention.

In a further embodiment of the invention, carbon dioxide precipitated by means of the carbon dioxide precipitation plant is channeled to a storage facility.

This ensures environmentally friendly handling of the carbon dioxide and, in particular, prevents its being able to escape into and mixing with the atmosphere, which would impact on the environment in a climatically harmful manner.

It is furthermore advantageous if the carbon dioxide is stored in a liquid and/or solid aggregate state, in particular a frozen state.

This minimizes both the risk of the carbon dioxide's escaping from the storage facility into the atmosphere and the safety requirements placed on the storage facility.

The invention leads further to a device for operating a gas turbine with a fossil-fuel fired combustion chamber according to the applicable independent subclaim.

Preferred embodiments of a device according to the invention are described in the subclaims dependent on said independent subclaim.

The details and explanations provided in connection with a method according to the invention and its embodiments are transferable to a device according to the invention and its embodiments and so will not be repeated here.

An exemplary embodiment of the invention is presented in greater detail below.

BRIEF DESCRIPTION OF THE DRAWING

FIGURE shows a device according to the invention embodied as a gas and steam power station.

DETAILED DESCRIPTION OF INVENTION

The FIGURE shows a device 1 according to the invention for operating a gas turbine, said turbine comprising a free power turbine 3, a combustion chamber 5, and a condenser 19. The device 1 is embodied as a gas and steam power station.

A hot gas made ready in the combustion chamber 5 is made to impinge on the free power turbine 3. A fossil fuel 7 is channeled to and burned in the combustion chamber 5 for this.

On completion of work, the still hot gas exits the free power turbine 3 in the form of exhaust gas 9 and is channeled to a waste-heat steam generator 28, by means of which process steam 31 is generated for a steam turbine 33. Said type of coupling of the steam turbine 33 to the free power turbine 3 is referred to as a GUD process, which is characterized in particular by a high degree of efficiency in the generation of power.

To generate electrical energy a generator G is coupled to the free power turbine 3. A further generator, not shown in the FIGURE, is customarily linked to the steam turbine 33.

The exhaust gas 9 exiting the waste-heat steam generator 28 is channeled to a cooling device 27, embodied in a two-stage form, which comprises a first cooling stage 271 and a second cooling stage 272.

The first cooling stage 271 is operated in the present exemplary embodiment by means of a coolant 37, which is also used to operate a condenser 35 which is connected downstream of the steam turbine 33 and into which expanded steam 43 exiting the steam turbine 33 is introduced.

As a result of the cooling of the exhaust gas 9 in the first cooling stage 271, part of the water 29 contained in said gas precipitates in liquid form and can be removed.

The exhaust gas 9 is further cooled in the second cooling stage 272, in particular down to temperatures just above the freezing point of water in order to prevent icing. This cooling again causes water 29 still contained in the exhaust gas to precipitate in liquid form and this can again be removed.

After exiting the cooling device 27, the stream of exhaust gas 9 is divided by means of a branching device 23 into a first partial stream 11 and a second partial stream 13.

Preferably approximately half the exhaust gas stream is channeled as the second partial stream 13 to a carbon dioxide precipitation plant 21 in which said stream is further cooled and carbon dioxide 41 precipitating during this process is removed and introduced into a storage facility 39.

The first partial stream 11, which according to a preferred embodiment comprises half the exhaust gas stream upstream of the branching device 23, is mixed by means of a mixing device 25 with combustion air 15 and channeled back as mixture 17 to the combustion chamber 5 via the condenser 19.

According to the present embodiment the mixture 17 no longer has the normal oxygen content of the combustion air 15, usually approximately 21%, but only just over half of it, approximately 12%.

Said reduction in oxygen content compared to the prior art is due to the fact that the mixture 17 consists in part, preferably, as mentioned above, in the amount of one half, of a recirculated partial stream of exhaust gas, namely the first partial stream 11, which has a low oxygen component.

The remaining part of the mixture 17 is formed by the combustion air 15 so that the percentage of oxygen in the mixture 17 is significantly less than the oxygen content of the unmixed combustion air 15.

Except for a small residue (0 to 5%, typically 3%), said reduced amount of oxygen in the mixture 17 is used during the ensuing combustion process in the combustion chamber 5 for burning the fossil fuel 7.

The oxygen content of the mixture 17 is therefore established as required by means of the mixing device 25 by setting the quantitative relationship between the first partial stream 11 and the combustion air 15. The oxygen content of the mixture 17 is preferably set low enough, yet sufficiently high, for the fossil fuel 7 to be burned completely in the combustion chamber 5 and for practically no unburned portions and/or carbon monoxide to remain or to be formed.

The reduced oxygen content compared to the prior art depresses the rate at which nitrogen oxides form, the tendency for such formation being significantly lessened owing to the reduced partial oxygen pressure in the combustion flame. Furthermore, the temperature of the flame is lower compared to combustion in a normal air atmosphere owing to the high inert gas component.

Since compared to solutions ensuing from the prior art only a part of the exhaust gas stream, preferably about half, is channeled to the carbon dioxide precipitation plant 21, said plant only needs to be designed for a smaller amount of exhaust gas, with the amount of energy required to cool the exhaust gas 9 in said plant being reduced commensurately.

The proposed device offers a welcome subsidiary feature in that, particularly in areas prone to water shortage, the precipitated water 29 can be multifariously reused, thereby contributing to the water supply.

A method according to the invention or a corresponding device makes it possible to implement, in particular, a mode of operating a power station where practically no climatically harmful carbon dioxide is produced.

The invention can be summarized as follows:

A method according to the invention or a corresponding device provides for dividing exhaust gas exiting the gas turbine into a first and a second partial stream, for mixing the first partial stream with combustion air, for channeling the resulting mixture back to the combustion chamber, and for channeling the second partial stream to a carbon dioxide precipitation plant.

In an advantageous embodiment the exhaust gas exiting the gas turbine is previously used to generate process steam for a steam turbine (gas and steam power station) then cooled before the exhaust gas is divided into said partial streams. Water precipitating during cooling is removed.

The invention claimed is:

1. A method for operating a gas turbine with a fossil-fuel fired combustion chamber comprising:
    dividing exhaust gas exiting the gas turbine into a first and a second partial stream;
       mixing the first partial stream with combustion air;
       channeling the resulting mixture back to the combustion chamber;
       feeding the second partial stream to a carbon dioxide precipitation plant;
    wherein the exhaust gas is cooled before being divided into the first and second partial stream and water forming during this process is removed;
    wherein cooling of the exhaust gas takes place in at least a first and a second cooling stage; and
    wherein the exhaust gas is channeled after exiting the gas turbine to a waste-heat steam generator for generating process steam for a steam turbine, then to the first cooling stage.

2. A method according to claim 1, wherein the first cooling stage is operated by means of a coolant which is also used as a coolant of a condenser into which expanded steam exiting the steam turbine is introduced.

3. A method according to claim 1, wherein the carbon dioxide precipitation plant incorporates a cooling process for cooling the second partial stream.

4. A method according to claim 1, wherein carbon dioxide precipitated by the carbon dioxide precipitation plant is channeled to a storage facility.

5. A method according to claim 4, wherein the carbon dioxide is stored in a liquid or solid aggregate state.

6. A device for operating a gas turbine with a fossil-fuel fired combustion chamber comprising:
    a branching device dividing exhaust gas exiting the gas turbine into a first and a second partial stream;
    a mixing device for mixing the first partial stream with combustion air and channeling the resultant mixture stream to the combustion chamber;
    a carbon dioxide precipitation plant adapted to be fed by the second partial stream; and
    a cooling device located upstream of the branching device to cool the exhaust gas and to remove water precipitated during this process, wherein the cooling device has at least a first and a second cooling stage; and a waste-heat steam generator located downstream of the gas turbine and upstream of the first cooling stage adapted to generate process steam for a steam turbine.

7. A device according to claim 6, further comprising a condenser located downstream of the steam turbine, the first cooling stage being capable of being operated by a coolant which is also used as a coolant of the condenser.

8. A device according to claim 6, wherein the carbon dioxide precipitation plant is embodied as a refrigeration plant to cool the second partial stream.

9. A device according to claim 6, further comprising: a storage facility in which carbon dioxide precipitated by the carbon dioxide precipitation plant can be stored.

10. A device according to claim 9, wherein the storage facility is embodied for storing at least one of the group of liquid and solid carbon dioxide.

11. A method according to claim 1, wherein the carbon dioxide precipitation plant incorporates a cooling process for cooling the second partial stream.

12. A method according to claim 1, wherein carbon dioxide precipitated by the carbon dioxide precipitation plant is channeled to a storage facility.

13. A device according to claim 10, wherein the storage facility is embodied for storing frozen carbon dioxide.

14. A device according to claim 6, wherein the carbon dioxide precipitation plant is embodied as a refrigeration plant to cool the second partial stream.

* * * * *